United States Patent
Kanke et al.

(10) Patent No.: US 10,444,116 B2
(45) Date of Patent: Oct. 15, 2019

(54) DRIVE TRAIN TESTING SYSTEM AND DRIVE TRAIN TESTING METHOD

(71) Applicant: MEIDENSHA CORPORATION, Tokyo (JP)

(72) Inventors: Masayasu Kanke, Tokyo (JP); Masami Nishihara, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/328,211

(22) PCT Filed: Aug. 23, 2017

(86) PCT No.: PCT/JP2017/030073
§ 371 (c)(1),
(2) Date: Feb. 25, 2019

(87) PCT Pub. No.: WO2018/038144
PCT Pub. Date: Mar. 1, 2018

(65) Prior Publication Data
US 2019/0178750 A1  Jun. 13, 2019

(30) Foreign Application Priority Data
Aug. 26, 2016 (JP) .................................. 2016-165976

(51) Int. Cl.
*G01M 17/00* (2006.01)
*G01M 13/02* (2019.01)
*G01M 17/007* (2006.01)

(52) U.S. Cl.
CPC .......... *G01M 13/02* (2013.01); *G01M 17/007* (2013.01)

(58) Field of Classification Search
USPC ............................ 73/116.01, 116.02, 116.05
See application file for complete search history.

(56) References Cited

U.S. PATENT DOCUMENTS 5,375,461 A * 12/1994 Suzuki .............. G01M 17/0072
                                                                73/116.06
5,465,612 A * 11/1995 La Belle ................ G01L 5/282
                                                                73/116.06
(Continued)

FOREIGN PATENT DOCUMENTS

JP    2009-287986 A    12/2009
JP    2010-271151 A    12/2010
(Continued)

*Primary Examiner* — Eric S. McCall
(74) *Attorney, Agent, or Firm* — Muncy, Geissler, Olds & Lowe, P.C.

(57) ABSTRACT

The purpose of the present invention is to provide a drive train testing system whereby torque fluctuation in a real engine can be reproduced with good precision. A drive train testing system is provided with an input-side dynamometer connected to an input shaft WI of a test piece W which is a vehicle drive train, a torque command generation device for generating a torque command signal for causing a torque resembling that of a vehicle engine to be generated by the input-side dynamometer, and a rotation detector for detecting a motor machine angle corresponding to an absolute position from a reference position of a rotary shaft of the input-side dynamometer. Using the motor machine angle detected by the rotation detector, the torque command generation device generates a torque command signal fluctuating in synchrony with a signal having a period that is a predetermined degree multiple of the motor machine angle.

18 Claims, 8 Drawing Sheets

(56) References Cited

U.S. PATENT DOCUMENTS

| | | | | |
|---|---|---|---|---|
| 2003/0088345 A1* | 5/2003 | Akiyama | ............ | G01M 15/044 |
| | | | | 701/32.8 |
| 2004/0000191 A1* | 1/2004 | Ben-David | ............ | G01L 5/282 |
| | | | | 73/116.06 |
| 2010/0251811 A1* | 10/2010 | Akiyama | .............. | G01M 15/02 |
| | | | | 73/116.05 |
| 2015/0013443 A1* | 1/2015 | Kanke | .................. | G01M 13/025 |
| | | | | 73/115.01 |
| 2015/0219529 A1* | 8/2015 | Akiyama | ............ | G01M 13/025 |
| | | | | 73/115.01 |
| 2016/0109328 A1 | 4/2016 | Kanke et al. | | |
| 2018/0328815 A1* | 11/2018 | Akiyama | .............. | G01M 15/02 |
| 2019/0137361 A1* | 5/2019 | Akiyama | .............. | G01M 15/02 |

FOREIGN PATENT DOCUMENTS

| | | |
|---|---|---|
| JP | 2010-276340 A | 12/2010 |
| JP | 2014-215253 A | 11/2014 |
| JP | 2016-080388 A | 5/2016 |
| WO | WO 2014/175203 A1 | 10/2014 |

* cited by examiner

DRIVE TRAIN TESTING SYSTEM AND DRIVE TRAIN TESTING METHOD

TECHNICAL FIELD

The present invention relates to a drive train testing system and a drive train testing method. More specifically, the present invention relates to a drive train testing system which uses a motor connected to a drive train of a vehicle so as to produce a torque that simulates an engine, and to a drive train testing method using such a drive train testing system.

BACKGROUND ART

A drive train collectively refers to a plurality of devices for transmitting energy produced in an engine to drive wheels, and is formed with various devices such as an engine, a clutch, a flywheel, a transmission, a torque converter, a damper, a drive shaft, a propeller shaft, a differential gear, and drive wheels. In a drive train testing system, the drive train as described above or a constituent device thereof is used as a test piece, a torque which is produced with a motor is input to the test piece instead of an actual engine and thus the durability, the quality and the like thereof are evaluated.

In the actual engine, the reciprocation motion of a piston within each cylinder is converted into the rotation motion of a crankshaft, and here, a periodical torque variation caused in the combustion step of each cylinder is produced. Hence, in the drive train testing system, a direct-current signal, a predetermined vibration frequency and an alternating-current signal of a vibration amplitude for drive under predetermined acceleration and deceleration are combined together so as to generate a torque command signal, and this torque command signal is input to an inverter of the motor (see, for example, Patent Document 1). In this way, in the drive train testing system, a test of the test piece is performed in an environment simulating the actual engine.

Patent Document 1: Japanese Unexamined Patent Application, Publication No. 2014-215253

DISCLOSURE OF THE INVENTION

Problems to be Solved by the Invention

Incidentally, the torque variation in the actual engine is produced in synchronization with the mechanical phase of the engine, that is, the machine angle of a crankshaft, the position of a piston and the like. Hence, in order to highly accurately reproduce the actual engine, it is preferable to vary the torque generated in the motor in synchronization with the mechanical phase of the engine.

However, in the conventional drive train testing system, the period of the torque command signal is set based on the rotation speed of the motor obtained by a rotation detector provided in the motor. More specifically, the rotation speed described above is integrated, and thus the phase of the motor is calculated, with the result that the torque command signal is periodically varied according to this phase. Hence, depending on a position in which the integration of the rotation speed is started, that is, a phase when the rotation of the motor is started, the phase of the torque produced in the motor may be displaced from the original reference. When an error is present in a sensor for detecting the rotation speed, errors are accumulated by the integration operation as described above, with the result that the phase of the torque produced in the motor may be displaced.

Among components used in the drive train, a component which is designed such that the component does not achieve its performance without being synchronized with the mechanical phase of the engine may be used. Hence, in the conventional testing system, it may be difficult to appropriately evaluate the performance of the drive train as described above.

An object of the present invention is to provide a drive train testing system and a drive train testing method which can highly accurately reproduce a torque variation in an actual engine.

Means for Solving the Problems (1) A drive train testing system (for example, a testing system 1, 1A, 1B, 1C, 1D which will be described later) includes: a motor (for example, an input side dynamometer 2 which will be described later) that is connected to an input shaft (for example, an input shaft WI which will be described later) of a drive train of a vehicle; a torque command generation device (for example, a torque command generation device 5, 5A, 5B, 5C, 5D) that generates a torque command signal for producing a torque which simulates an engine of the vehicle with the motor; and a machine angle acquisition means (for example, a rotation detector 4, 4A and an inverter 6A which will be described later) which acquires a motor machine angle that corresponds to an absolute position from a reference position of a rotation shaft (for example, a rotation shaft 21 which will be described later) of the motor, and the torque command generation device uses the motor machine angle acquired by the machine angle acquisition means so as to generate the torque command signal which is varied in synchronization with a signal that has a period of a predetermined order multiple of the motor machine angle.

(2) Preferably, in this case, the machine angle acquisition means includes an absolute encoder (for example, a rotation detector 4 which will be described later) which produces a signal corresponding to the motor machine angle.

(3) Preferably, in this case, the machine angle acquisition means includes: an incremental encoder (for example, a rotation detector 4A which will be described later) which produces, when the rotation shaft is rotated, a pulse signal corresponding to the amount of displacement of the rotation; and an inverter (for example, an inverter 6A which will be described later) which uses the pulse signal of the incremental encoder so as to calculate the motor machine angle and which uses the motor machine angle to supply a drive current to the motor so as to realize the torque command signal.

(4) Preferably, in this case, the torque command generation device multiplies the order and the motor machine angle together so as to calculate a phase angle, and multiplies a sine wave or a cosine wave corresponding to the phase angle and a predetermined vibration amplitude together so as to obtain an alternating-current component of the torque command signal.

(5) Preferably, in this case, the torque command generation device uses the motor machine angle and the number of cylinders in the engine so as to calculate cylinder machine angles corresponding to positions of pistons for the individual cylinders, uses the cylinder machine angles for the individual cylinders and the rotation speed of the rotation shaft calculated with the motor machine angle so as to calculate produced torques for the individual cylinders and sums the produced torques for the individual cylinders so as to obtain the torque command signal.

(6) Preferably, in this case, the torque command generation device multiplies the order and the motor machine angle together so as to calculate a reference phase angle, subtracts a predetermined correction phase angle from the reference phase angle so as to calculate a phase angle and multiplies a sine wave or a cosine wave corresponding to the phase angle and a predetermined vibration amplitude together so as to obtain an alternating-current component of the torque command signal.

(7) Preferably, in this case, the torque command generation device subtracts a predetermined correction phase angle from the motor machine angle so as to calculate a phase angle, uses the phase angle and the number of cylinders in the engine so as to calculate cylinder machine angles corresponding to positions of pistons for the individual cylinders, uses the cylinder machine angles for the individual cylinders and the rotation speed of the rotation shaft calculated with the motor machine angle so as to calculate produced torques for the individual cylinders and sums the produced torques for the individual cylinders so as to obtain the torque command signal.

(8) A drive train testing method is a method which uses the drive train testing system according to (4) or (5) to input a drive torque produced in the motor to the input shaft of the drive train that is a test piece so as to evaluate the performance of the test piece, and includes: a test piece coupling step of coupling the input shaft to the rotation shaft so as to make positions thereof coincide with each other such that a reference position of the input shaft and a reference position of the rotation shaft coincide with each other; and a test step of using the torque command signal generated by the torque command generation device so as to evaluate the performance of the test piece while driving the motor.

(9) A drive train testing method is a method which uses the drive train testing system according to (6) or (7) to input a drive torque produced in the motor to the input shaft of the drive train that is a test piece so as to evaluate the performance of the test piece, and includes: a test piece coupling step of coupling the input shaft to the rotation shaft; a correction phase angle setting step of acquiring the motor machine angle when a position of rotation of the input shaft reaches a reference position thereof while the motor is being rotated so as to set the acquired motor machine angle as the correction phase angle; and a test step of using the torque command signal generated by the torque command generation device so as to evaluate the performance of the test piece while driving the motor.

Effects of the Invention (1) In the present invention, a machine angle acquisition means is used so as to acquire a motor machine angle which corresponds to an absolute position from the reference position of the rotation shaft of a motor, and this motor machine angle is used so as to generate a torque command signal which is varied in synchronization with a signal that has a period of a predetermined order multiple of the motor machine angle. In a drive train testing system, the torque command signal generated in this way is used so as to input a drive torque produced in the motor to the input shaft of a drive train. In this way, it is possible to input the drive torque which is varied in synchronization with the mechanical phase of the actual engine to a test piece. The motor machine angle is used such that the phase of the torque command signal is prevented from being varied by the phase when the rotation of the motor is started and is also prevented from being varied by the accumulation of errors. The drive torque which is varied in synchronization with the mechanical phase of the actual engine is input to the test piece, and thus it is possible to appropriately evaluate the performance of the test piece which is designed to achieve its performance in synchronization with the mechanical phase of the engine as described above.

(2) In the present invention, as the machine angle acquisition means, an absolute encoder which produces a signal corresponding to the motor machine angle is used. In this way, it is possible to highly accurately acquire the motor machine angle.

(3) In the present invention, as the machine angle acquisition means, an incremental encoder which produces, when the rotation shaft is rotated, a pulse signal corresponding to the amount of displacement of the rotation and an inverter which uses the pulse signal of the incremental encoder so as to calculate the motor machine angle and which uses the motor machine angle to supply a drive current to the motor so as to realize the torque command signal are used. In other words, in the present invention, the motor machine angle which can be obtained by computation in the inverter is used, and thus it is possible to acquire the motor machine angle without provision of a special device which is not mounted on a normal testing system like the absolute encoder.

(4) In the present invention, the order and the motor machine angle are multiplied together so as to calculate a phase angle, and a sine wave or a cosine wave corresponding to the phase angle and a vibration amplitude are multiplied together so as to obtain an alternating-current component of the torque command signal. In this way, by simple computation, it is possible to generate the torque command signal that is a sine wave or a cosine wave which has a period of an order multiple of the motor machine angle and which has an amplitude corresponding to the vibration amplitude.

(5) In the present invention, the motor machine angle and the number of cylinders in the engine are used so as to calculate cylinder machine angles for the individual cylinders, the cylinder machine angles for the individual cylinders and the rotation speed are used so as to calculate produced torques for the individual cylinders and the produced torques for the individual cylinders are further summed so as to obtain the torque command signal. In this way, it is possible to generate the torque command signal which has a period of an order multiple of the motor machine angle and which is varied in a form close to a torque variation in the actual engine. In this way, the test of the drive train can be performed under an environment close to the actual engine.

(6) As described previously, among components used in the drive train, a component may be used which is designed such that the component does not achieve its performance without being synchronized with the mechanical phase of the engine, and in the drive train, as described above, attachment is performed such that reference positions coincide with each other at the time of attachment to the actual engine. Hence, when the drive train as described above is tested in the drive train testing system, the positions need to be made to coincide with each other such that the reference position of the input shaft of the drive train coincides with the reference position of the rotation shaft of the motor. In the present invention, the order and the motor machine angle are multiplied together so as to calculate a reference phase angle, a correction phase angle is subtracted from the reference phase angle so as to calculate a phase angle and a sine wave or a cosine wave corresponding to the phase angle and a vibration amplitude are multiplied together so as to obtain an alternating-current component of the torque command signal. In this way, even when the input shaft of the drive train and the rotation shaft of the motor are connected such that the reference position of the input shaft of the drive train and the reference position of the rotation shaft of the motor are displaced from each other, this displacement can be corrected later through the correction phase angle.

(7) In the present invention, a correction phase angle is subtracted from the motor machine angle so as to calculate a phase angle, the phase angle and the number of cylinders in the engine are used so as to calculate cylinder machine angles for the individual cylinders, the cylinder machine angles for the individual cylinders and the rotation speed are used so as to calculate produced torques for the individual cylinders and the produced torques for the individual cylinders are summed so as to obtain the torque command signal. In this way, it is possible to generate the torque command signal which has a period of an order multiple of the motor machine angle and which is varied in a form close to a torque variation in the actual engine. Even when the input shaft of the drive train and the rotation shaft of the motor are connected such that the reference position of the input shaft of the drive train and the reference position of the rotation shaft of the motor are displaced from each other, this displacement can be corrected later through the correction phase angle.

(8) In a testing method of the present invention, an input shaft of a test piece is coupled to a rotation shaft of a motor while the positions thereof are made to coincide with each other such that the reference position of the input shaft and the reference position of the rotation shaft coincide with each other, and a torque command signal generated with the torque command generation device of (4) or (5) is further used so as to evaluate the performance of the test piece while the motor is being driven. In this way, a drive torque which is varied in synchronization with the mechanical phase of the actual engine is input to the test piece, with the result that it is possible to appropriately evaluate its performance.

(9) In a testing method of the present invention, after an input shaft and a rotation shaft are coupled together, a motor machine angle when the position of rotation of the input shaft reaches its reference position while the motor is being rotated is acquired, this motor machine angle is set as a correction phase angle and thereafter the performance of the test piece is evaluated by use of a torque command signal generated in the torque command generation device of (6) or (7) while the motor is being driven. In this way, without the positions being made to coincide with each other such that the reference positions of the input shaft and the rotation shaft coincide with each other when they are coupled together, after the coupling, the correction phase angle is set to an appropriate size, and thus the drive torque which is varied in synchronization with the mechanical phase of the actual engine is input to the test piece, with the result that it is possible to appropriately evaluate its performance.

PREFERRED MODE FOR CARRYING OUT THE INVENTION

First Embodiment

A testing system 1 according to a first embodiment of the present invention will be described in detail below with reference to drawings.

Figure 1:
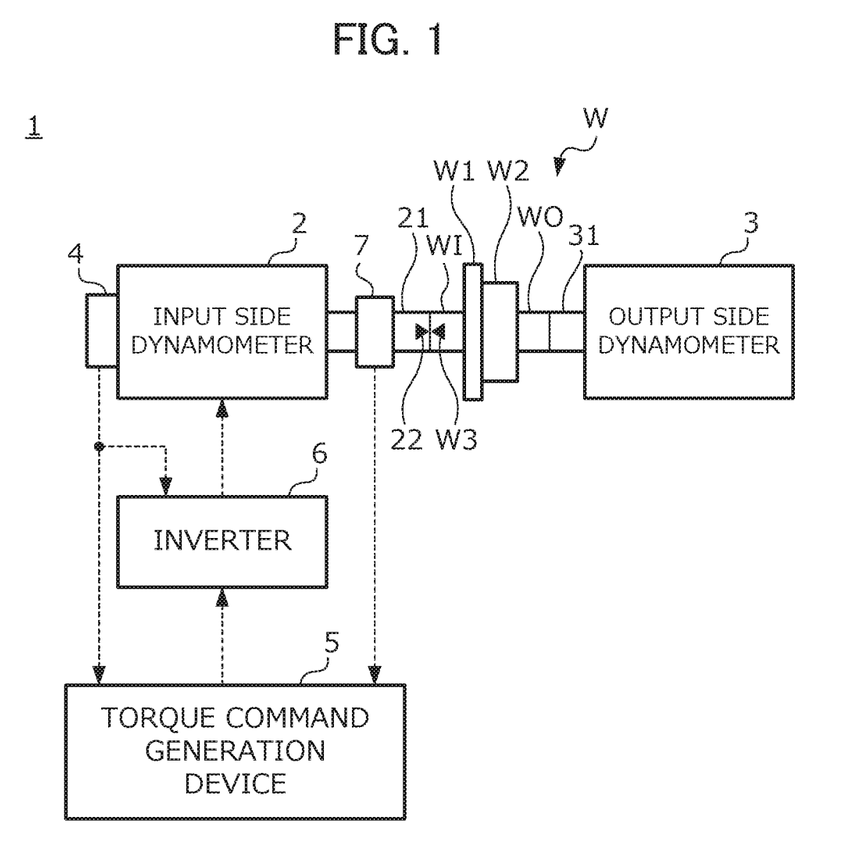
FIG. 1 is a diagram showing the configuration of a testing system according to a first embodiment of the present invention.

FIG. 1 is a diagram showing the configuration of the testing system 1 according to the present embodiment. The testing system 1 includes: a test piece W which is the drive train of a vehicle; an input side dynamometer 2 whose rotation shaft 21 is coaxially coupled to the input shaft WI of the test piece W; an output side dynamometer 3 whose rotation shaft 31 is coaxially coupled to the output shaft WO of the test piece W; a rotation detector 4 which detects the rotation of the rotation shaft 21; a torque command generation device 5 which uses an output signal of the rotation detector 4 so as to generate a torque command signal corresponding to a command for a torque that is produced in the input side dynamometer 2; an inverter 6 which supplies a drive current corresponding to the torque command signal to the input side dynamometer 2; and a shaft torque meter 7 which detects a shaft torque of the rotation shaft 21. In the testing system 1, a drive torque that simulates the engine of the vehicle on which the test piece W is mounted is produced in the input side dynamometer 2, and while this drive torque is being input to the input shaft WI of the test piece W, an output of the test piece W is absorbed in the output side dynamometer 3, with the result that a test for evaluating the durability, the quality and the like of the test piece W is performed.

Although the test piece W is formed with, for example, the input shaft WI, a flywheel W1 which is coupled to the input shaft WI, a damper W2 which is coupled to the flywheel W1 and the output shaft WO which is coupled to the damper W2, the present invention is not limited to this configuration. The test piece W may have any configuration as long as the test piece W is a component which forms the drive train of the vehicle.

As the rotation detector 4, an absolute encoder is used which detects a motor machine angle [°] that corresponds to an absolute position from a predetermined reference position of the rotation shaft 21 in the input side dynamometer 2. The rotation detector 4 detects one revolution of the rotation shaft 21 with a predetermined resolution (for example, 20 bits), produces a code signal corresponding to the motor machine angle and transmits it to the inverter 6 and the torque command generation device 5.

The inverter 6 uses the motor machine angle which is detected with the rotation detector 4 and the torque command signal which is generated in the torque command generation device 5 by a procedure that will be described later, and thereby supplies the drive current to the input side dynamometer 2 by a known method such as PWM control or vector control such that the drive torque corresponding to the torque command signal is produced in the input side dynamometer 2.

The torque command generation device 5 uses the motor machine angle detected with the rotation detector 4 and the shaft torque detected with the shaft torque meter 7 so as to generate, the torque command signal for producing, in the input side dynamometer 2, the drive torque that simulates the engine of the vehicle on which the test piece W is mounted, and inputs it to the inverter 6.

Figure 2:
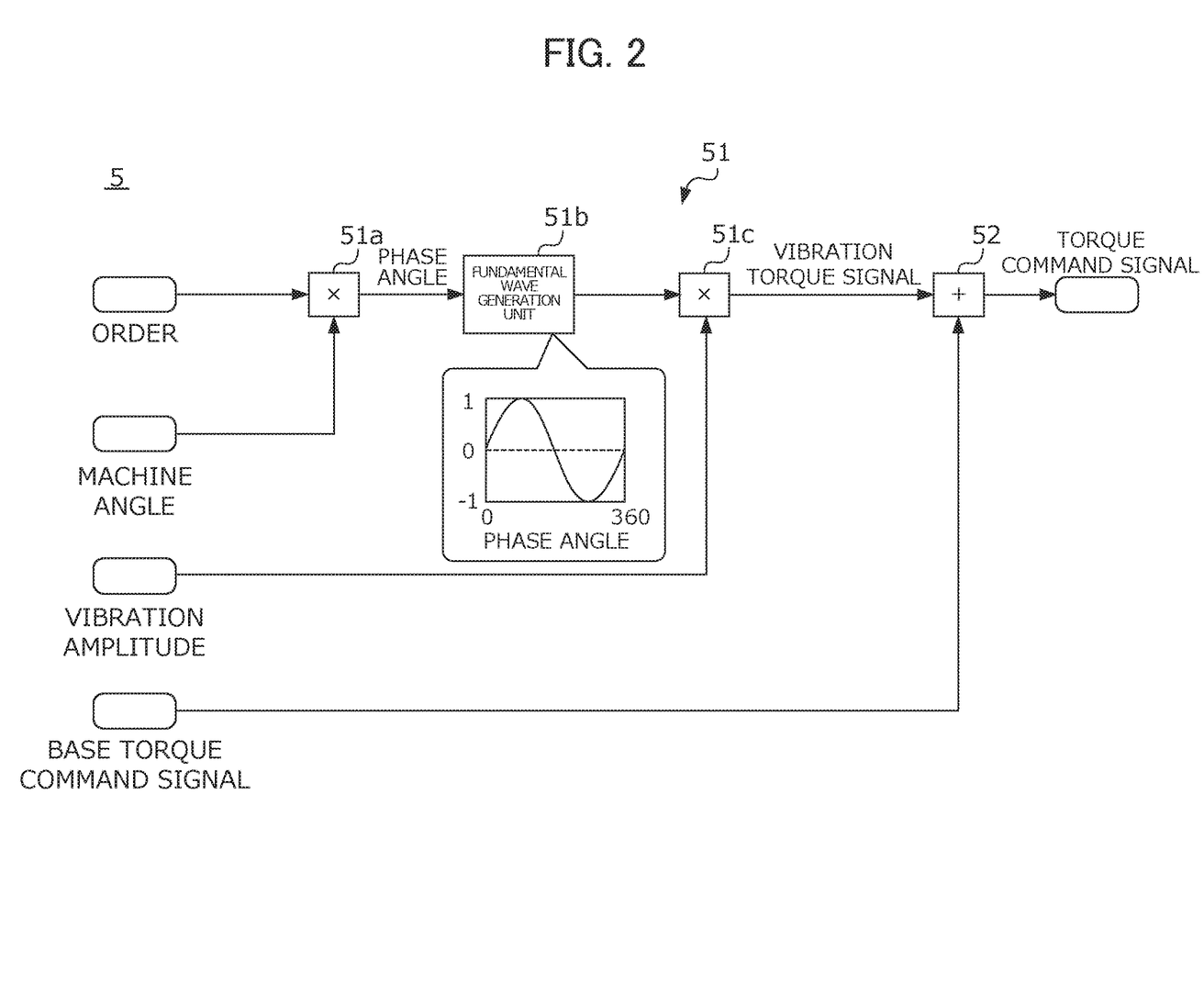
FIG. 2 is a block diagram showing a specific computation procedure for generating a torque command signal in a torque command generation device in the embodiment.

FIG. 2 is a block diagram showing a specific computation procedure for generating the torque command signal in the torque command generation device 5. The torque command generation device 5 superimposes, using an addition unit 52, an alternating-current vibration torque signal determined by a vibration signal generation unit 51 on a direct-current base torque command signal determined by unillustrated processing, and thereby generates the torque command signal which simulates a periodic torque variation in the actual engine.

When in the vibration signal generation unit 51, an order that corresponds to the number of times combustion occurs while a crank shaft is rotated 360° in the engine of the vehicle on which the test piece is mounted, the motor machine angle [°] and a vibration amplitude [Nm] that corresponds to the amplitude of the vibration torque signal are input, the vibration signal generation unit 51 uses a multiplication unit 51a, a fundamental wave generation unit 51b and a multiplication unit 51c so as to generate the vibration torque signal. Here, as the order and the vibration amplitude, values set by an operator are used, and as described with reference to FIG. 1, as the motor machine angle, a value detected with the rotation detector is used. More specifically, the multiplication unit 51a multiplies the order and the motor machine angle together so as to calculate a phase angle [°]. The fundamental wave generation unit 51b calculates a fundamental wave corresponding to the calculated phase angle (more specifically, as shown in FIG. 2, calculates a sine wave or a cosine wave with the assumption that the period is 360° and that the amplitude is 1). The multiplication unit 51c multiplies the calculated fundamental wave by the preset vibration amplitude so as to obtain the vibration torque signal.

Figure 3:
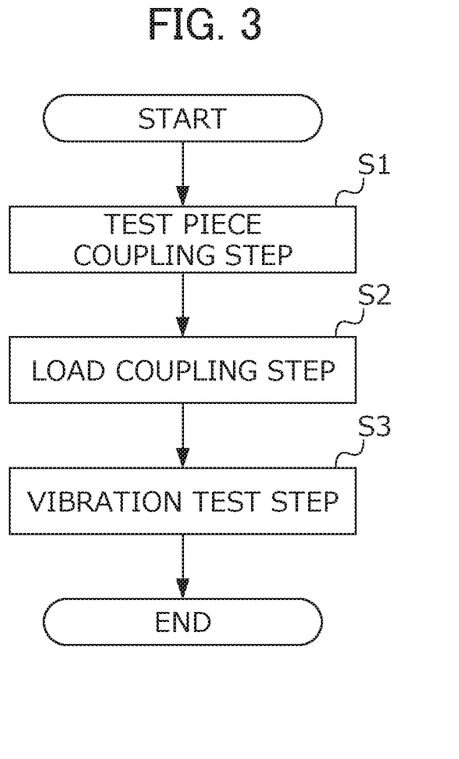
FIG. 3 is a flowchart showing a procedure for testing a test piece in the testing system according to the embodiment.

A test procedure for testing the test piece W with the testing system 1 as described above will be described next. FIG. 3 is a flowchart showing the procedure for testing the test piece W in the testing system 1. In the test piece coupling step of S1, the operator first sets the test piece W in the input side dynamometer 2. More specifically, the operator coaxially couples the input shaft WI to the rotation shaft 21 while making the positions of the shafts coincide with each other such that a reference position previously set in the input shaft WI of the test piece W and a reference position previously set in the rotation shaft 21 of the input side dynamometer 2 coincide with each other. This position coincidence operation is performed, for example, by previously putting marks W3 and 22 indicating the reference positions of the input shaft WI and the rotation shaft 21 respectively as shown in FIG. 1 and coupling the input shaft WI and the rotation shaft 21 such that the marks W3 and 22 coincide with each other.

Next, in the load coupling step of S2, the operator couples the rotation shaft 31 of the output side dynamometer 3 to the output shaft WO of the test piece W. Next, in the vibration test step of S3, the torque command signal obtained in the torque command generation device 5 by superimposing the vibration torque signal, as described previously, is input to the inverter 6, thus the drive torque corresponding to the torque command signal is produced in the input side dynamometer 2 and this drive torque is input to the input shaft WI of the test piece W, with the result that various types of performance of the test piece W are evaluated.

In the testing system 1 and the testing method of the present embodiment, the following effects are achieved.

(1) In the testing system 1, the motor machine angle is acquired with the rotation detector 4, the motor machine angle is used so as to generate the torque command signal which is varied in synchronization with a signal that has a period of an order multiple of the motor machine angle and this torque command signal is used so as to input the drive torque produced in the input side dynamometer to the input shaft WI. In this way, the drive torque which is varied in synchronization with the mechanical phase of the actual engine can be input to the test piece W. The motor machine angle is used, and thus the phase of the torque command signal is prevented from being varied by the phase when the rotation of the motor is started and is also prevented from being varied by the accumulation of errors. By inputting, to the test piece W, the drive torque that is varied in synchronization with the mechanical phase of the actual engine, it is possible to appropriately evaluate the performance of the test piece W which is designed to achieve its performance in synchronization with the mechanical phase of the engine as described above.

(2) In the testing system 1, as the rotation detector 4, the absolute encoder which produces a signal corresponding to the motor machine angle is used, and thus it is possible to highly accurately acquire the motor machine angle.

(3) In the testing system 1, the order and the motor machine angle are multiplied together such that the phase angle is calculated, the sinusoidal wave corresponding to the phase angle and the vibration amplitude are multiplied together so as to obtain the vibration torque signal and the torque command signal is generated with this vibration torque signal. In this way, by the simple computation, it is possible to generate the torque command signal which has a period of an order multiple of the motor machine angle and which has an amplitude corresponding to the vibration amplitude.

(4) In the test piece coupling step (S2) of the testing method according to the present embodiment, the input shaft WI is coupled to the rotation shaft 21 while the positions thereof are being made to coincide with each other such that the reference position of the input shaft WI of the test piece W and the reference position of the rotation shaft 21 of the input side dynamometer 2 coincide with each other, and the torque command signal generated with the torque command generation device 5 is further used so as to evaluate the performance of the test piece W while the input side dynamometer 2 is being driven. In this way, the drive torque which is varied in synchronization with the mechanical phase of the actual engine is input to the test piece W, and thus it is possible to appropriately evaluate its performance.

Second Embodiment

A testing system 1A according to a second embodiment of the present invention will be described next with reference to drawings. In the description of the testing system 1A below, the same configurations as those of the testing system 1 of the first embodiment are identified with the same reference numerals, and detailed description thereof will be omitted.

Figure 4:
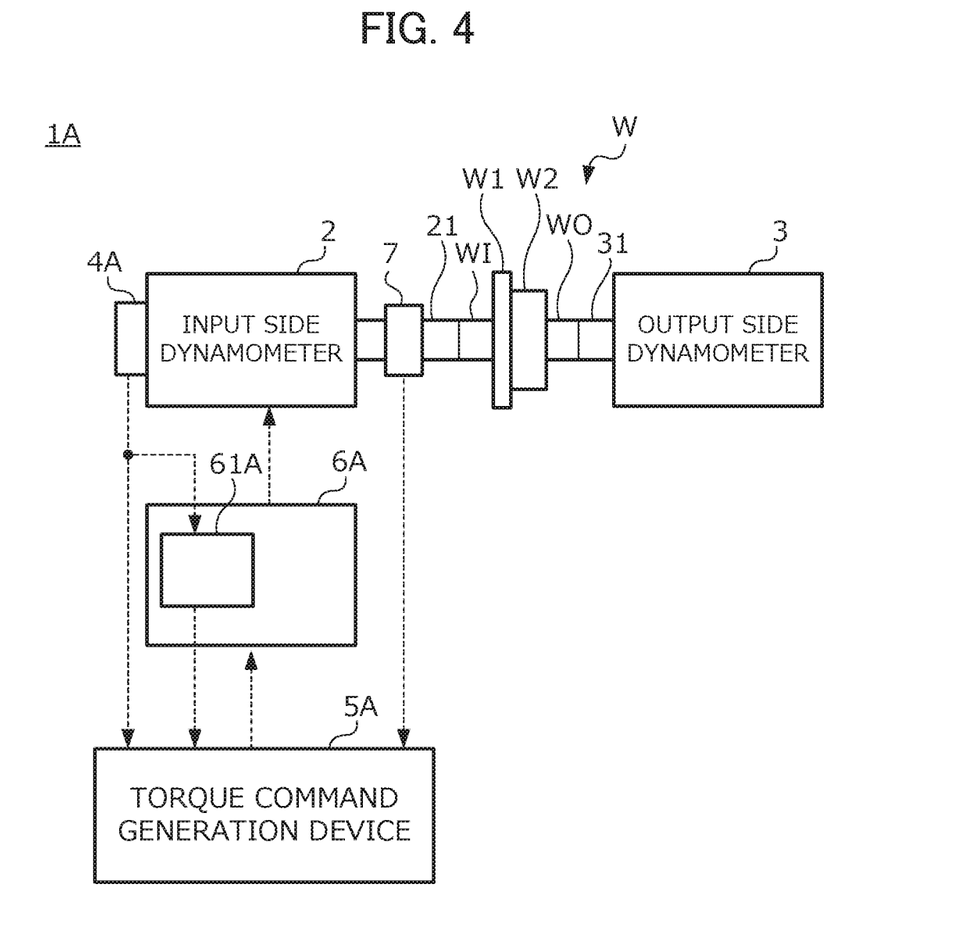
FIG. 4 is a diagram showing the configuration of a testing system according to a second embodiment of the present invention.

FIG. 4 is a diagram showing the configuration of the testing system 1A according to the present embodiment. The testing system 1A differs from the testing system 1 of FIG. 1 in the configurations of a rotation detector 4A, an inverter 6A and a torque command generation device 5A.

As the rotation detector 4A, an incremental encoder is used which produces, when the rotation shaft 21 is rotated, pulse signals of an A phase, a B phase and a Z phase corresponding to the amount of displacement of the rotation and which transmits them to the inverter 6A. The A phase is a reference output, and produces only pulses corresponding to the number of resolutions in one revolution of the rotation shaft 21. The B phase produces the same number of pulses as the A phase with a predetermined phase difference (for example, 90°) with respect to the A phase. The pulse signals of the A phase and the B phase are used, and thus it is possible to detect the direction of rotation of the rotation shaft 21. The Z phase is an origin reference output, and produces a pulse when the rotation shaft 21 is located in a predetermined reference position. Although the incremental encoder is advantageous in that the incremental encoder is inexpensive as compared with the absolute encoder used as the rotation detector 4 in the first embodiment, the incremental encoder is disadvantageous in that the incremental encoder cannot directly detect the motor machine angle of the rotation shaft 21.

The inverter 6A includes a machine angle calculation device 61A which uses the pulse signals transmitted from the rotation detector 4A so as to calculate the motor machine angle, and the inverter 6A uses the motor machine angle calculated by the machine angle calculation device 61A and the torque command signal so as to supply the drive current to the input side dynamometer 2 by a known method such as PWM control or vector control such that the drive torque corresponding to the torque command signal is produced in the input side dynamometer 2. Here, the machine angle calculation device 61A includes a counter which counts the number of pulse signals of the A phase produced in the rotation detector 4A, and further resets a value counted by the counter to zero each time the machine angle calculation device 61A receives the pulse signal of the Z phase produced in the rotation detector 4A, with the result that the motor machine angle is calculated from the pulse signals of the rotation detector 4A.

The torque command generation device 5A uses the motor machine angle calculated with the machine angle calculation device 61A of the inverter 6A and the shaft torque detected with the shaft torque meter 7 so as to generate the torque command signal for producing, with the input side dynamometer 2, the drive torque that simulates the engine of the vehicle on which the test piece W is mounted, and inputs it to the inverter 6A. A specific procedure for generating the torque command signal is the same as the procedure shown in FIG. 2 except that, as the motor machine angle, the motor machine angle acquired by the rotation detector 4A and the machine angle calculation device 61A is used, and thus detailed description thereof will be omitted. A test procedure for testing the test piece W with the testing system 1A is the same as the procedure shown in FIG. 3, and thus detailed description thereof will be omitted.

In the testing system 1A and the testing method of the present embodiment, the following effects are achieved.

(5) The testing system 1A uses the rotation detector 4A which is the incremental encoder that produces the pulse signals corresponding to the amount of displacement of the rotation when the rotation shaft 21 is rotated and the inverter 6A which uses the pulse signals of the rotation detector 4A so as to calculate the motor machine angle and which supplies the drive current to the input side dynamometer 2 so as to realize the torque command signal with this motor machine angle. In other words, in the testing system 1A, the motor machine angle which can be obtained by computation in the inverter 6A is used, and thus it is possible to acquire the motor machine angle without provision of a special device which is not mounted on a normal testing system like the absolute encoder.

Third Embodiment

A testing system 1B according to a third embodiment of the present invention will be described next with reference to drawings. In the description of the testing system 1B below, the same configurations as those of the testing system 1 of the first embodiment are identified with the same reference numerals, and detailed description thereof will be omitted.

Figure 5:
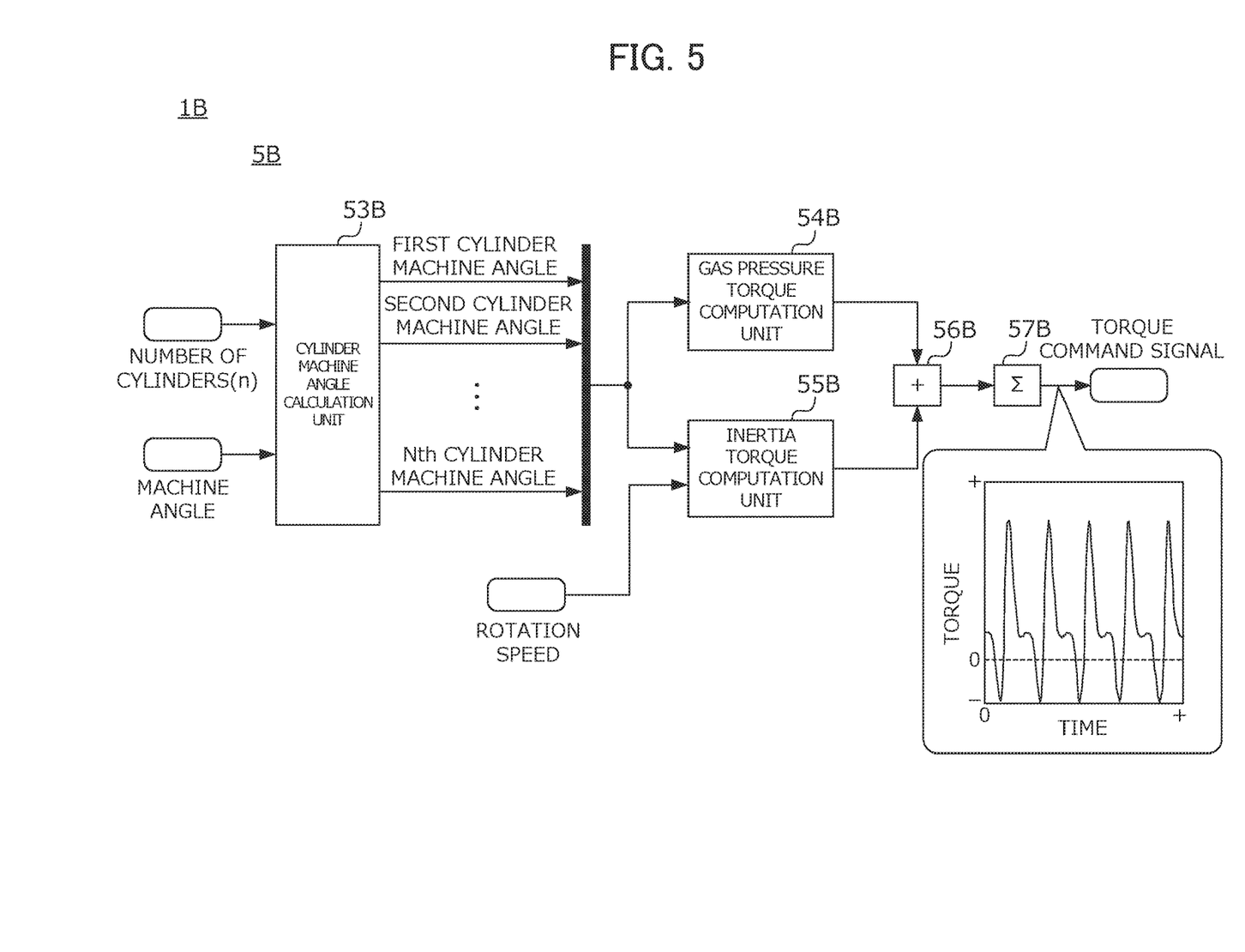
FIG. 5 is a block diagram showing a specific computation procedure for generating a torque command signal in a torque command generation device of a testing system according to a third embodiment of the present invention.

FIG. 5 is a block diagram showing a specific computation procedure for generating a torque command signal in a torque command generation device 5B of the testing system 1B according to the present embodiment.

The torque command generation device 5B includes a cylinder machine angle calculation unit 53B, a gas pressure torque computation unit 54B, an inertia torque computation unit 55B, an addition unit 56B and a torque summation unit 57B, and uses them so as to generate a torque command signal that simulates a periodic torque variation in the actual engine.

When the number of cylinders in the engine of the vehicle on which the test piece W is mounted and the motor machine angle [°] are input to the cylinder machine angle calculation unit 53B, the cylinder machine angles [°] corresponding to the positions of pistons which slide within the cylinders of the engine are calculated for the individual cylinders, that is, are calculated for only the number of cylinders. Here, a description will be given of a case where the engine is a four-stroke engine in which two revolutions (that is, 720°) of the crank shaft are set as one combustion cycle and where the phases of the pistons are individually displaced 720°/number of cylinders n each. In this case, the cylinder machine angle calculation unit 53B assumes that the first cylinder machine angle of the first cylinder is equal to the motor machine angle, that the second cylinder machine angle of the second cylinder is an angle obtained by adding 720°/n to the motor machine angle and that the nth cylinder machine angle of the nth cylinder is an angle obtained by adding (n−1)×(720°/n) to the motor machine angle.

The gas pressure torque computation unit 54B calculates, for each cylinder, a gas pressure torque Tg [Nm] which is a torque resulting from a gas pressure within the cylinder by use of, for example, formula (1) below. In formula (1) below, "Pg" corresponds to the gas pressure within the cylinder, and for example, a value calculated by searching an unillustrated table is used. "D" corresponds to the outside diameter of the piston, "r" corresponds to a crank radius, "ρ" corresponds to efficiency and values which are individually preset by the operator are used for these. "θ" corresponds to the cylinder machine angle, and a value which is calculated by the cylinder machine angle calculation unit 53B is used.

$$Tg = Pg \cdot \frac{\pi}{4} \cdot D^2 \cdot r\left(\sin\theta + \frac{\rho}{2}\sin 2\theta\right) \quad (1)$$

The inertia torque computation unit 55B calculates, for each cylinder, an inertia torque Ti [Nm] which is a torque resulting from the inertia of the piston reciprocating within the cylinder by use of, for example, formula (2) below. In formula (2) below, "M" corresponds to the mass of the piston and a connecting rod, and a value which is preset by the operator is used. "ω" corresponds to the rotation speed [rpm] of the rotation shaft in the input side dynamometer, and for example, a value calculated by differentiating the motor machine angle with respect to time is used.

$$Ti = M \cdot r^2 \cdot \omega^2 \left(\frac{\rho}{4}\sin\theta - \frac{1}{2}\sin 2\theta - \frac{3\rho}{4}\sin 3\theta\right) \quad (2)$$

For one of the n cylinders, the addition unit 56B sums the gas pressure torque Tg calculated in the gas pressure torque computation unit 54B and the inertia torque Ti calculated in the inertia torque computation unit 55B so as to calculate a produced torque in the corresponding cylinder. The torque summation unit 57B sums produced torques calculated in the addition unit 56B for the individual cylinders over all the n cylinders, and uses the result as the torque command signal. In this way, as shown in FIG. 5, the torque command signal which is varied at a period of an order multiple of the motor machine angle is generated.

A test procedure for testing the test piece W with the testing system 1B as described above is the same as the procedure shown in FIG. 3, and thus detailed description thereof will be omitted.

In the testing system 1B and the testing method of the present embodiment, the following effects are achieved.

(6) In the testing system 1B, the motor machine angle and the number of cylinders are used so as to calculate the cylinder machine angles for each of the cylinders, the cylinder machine angle for each of the cylinders and the rotation speed are used so as to calculate the gas pressure torque Tg and the inertia torque Ti for each of the cylinders and a torque obtained by summing the gas pressure torque and the inertia torque in the individual cylinders is used as the torque command signal. In this way, it is possible to generate the torque command signal which has a period of an order multiple of the motor machine angle and which is varied in a form close to a torque variation in the actual engine. In this way, the test of the test piece W can be performed under an environment close to the actual engine.

Fourth Embodiment

A testing system 1C according to a fourth embodiment of the present invention will be described next with reference to drawings. In the description of the testing system 1C below, the same configurations as those of the testing system 1 of the first embodiment are identified with the same reference numerals, and detailed description thereof will be omitted.

Figure 6:
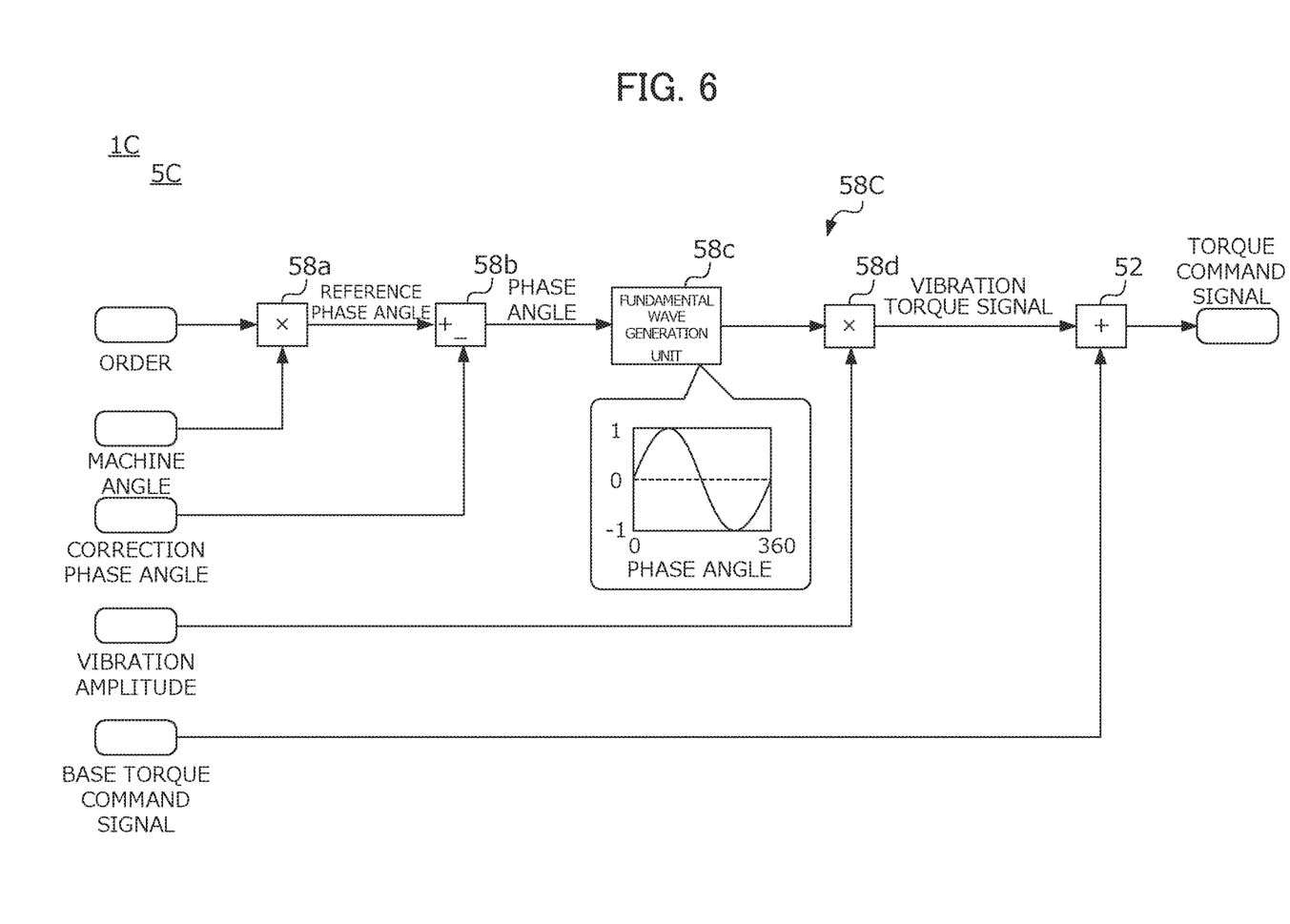
FIG. 6 is a block diagram showing a specific computation procedure for generating a torque command signal in a torque command generation device of a testing system according to a fourth embodiment of the present invention.

FIG. 6 is a block diagram showing a specific computation procedure for generating a torque command signal in a torque command generation device 5C of the testing system 1C according to the present embodiment. The torque command generation device 5C superimposes, using the addition unit 52, a vibration torque signal determined by a vibration signal generation unit 58C on a direct-current base torque command signal determined by unillustrated processing, and thereby generates a torque command signal which simulates a periodic torque variation in the actual engine.

When in the vibration signal generation unit 58C of the torque command generation device 5C, an order, a motor machine angle, a vibration amplitude and a correction phase angle [°] are input, the vibration signal generation unit 58C uses a multiplication unit 58a, a phase correction unit 58b, a fundamental wave generation unit 58c and a multiplication unit 58d so as to generate a vibration torque signal. Here, as the correction phase angle, a value which is set in S12 of FIG. 7 which will be described later is used. More specifically, the multiplication unit 58a multiplies the order and the motor machine angle together so as to calculate a reference phase angle [°] The phase correction unit 58b subtracts the correction phase angle from the reference phase angle so as to calculate a phase angle H. The fundamental wave generation unit 58c calculates a fundamental wave corresponding to the phase angle by a similar procedure as that of the fundamental wave generation unit 51b of FIG. 2. The multiplication unit 58d multiplies the calculated fundamental wave by a preset vibration amplitude so as to obtain a vibration torque signal.

Figure 7:
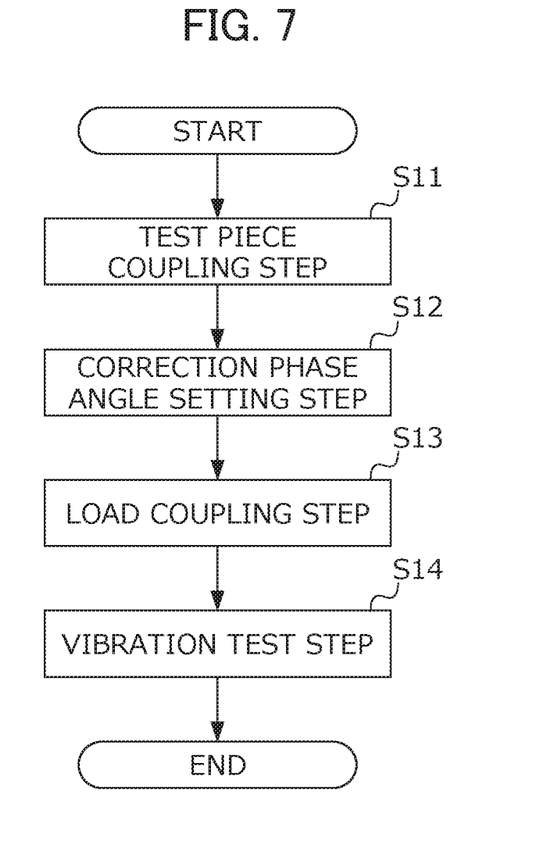
FIG. 7 is a flowchart showing a procedure for testing a test piece in the testing system according to the embodiment.

A test procedure for testing the test piece W with the testing system 1C as described above will be described next. FIG. 7 is a flowchart showing a procedure for testing the test piece W in the testing system 1C. In the test piece coupling step of S11, the operator first coaxially couples the input shaft WI of the test piece W to the rotation shaft 21 of the input side dynamometer 2. Although as described with reference to FIG. 3, in the testing system 1, the position coincidence operation of making the reference positions coincide with each other needs to be performed when the input shaft WI is coupled to the rotation shaft 21, in the testing system 1C of the present embodiment, the position coincidence operation as described above is not needed at the time of the coupling.

Next, in the correction phase angle setting step of S12, the motor machine angle when the position of rotation of the input shaft WI reaches its reference position while the rotation shaft 21 of the input side dynamometer 2 is being rotated at a low speed is recorded, and the recorded motor machine angle is set as the correction phase angle. Here, the time when the position of rotation of the input shaft WI reaches the reference position can be set as, for example, a time when the mark W3 (see FIG. 1) put on the input shaft WI reaches a vertex. The load coupling step of S13 and the vibration test step of S14 are the same as the steps of S2 and S3 respectively in FIG. 3, and thus detailed description thereof will be omitted.

In the testing system 1C and the testing method of the present embodiment, the following effects are achieved.

(7) As described previously, among components used in the drive train, a component may be used which is designed such that the component does not achieve its performance without being synchronized with the mechanical phase of the engine, and in the drive train as described above, attachment is performed such that reference positions coincide with each other at the time of attachment to the actual engine. Hence, when the drive train as described above is tested in the drive train testing system, the positions need to be made to coincide with each other such that the reference position of the input shaft WI of the test piece W coincides with the reference position of the rotation shaft 21 of the input side dynamometer 2. In the testing system 1C, the order and the motor machine angle are multiplied together such that the reference phase angle is calculated, the correction phase angle is further subtracted from the reference phase angle such that the phase angle is calculated and the sinusoidal wave and the vibration amplitude corresponding to the phase angle are multiplied together such that an alternating-current component of the torque command signal is obtained. In this way, even when the input shaft WI of the test piece W and the rotation shaft 21 of the input side dynamometer 2 are connected such that the reference position of the input shaft WI of the test piece W and the reference position of the rotation shaft 21 of the input side dynamometer 2 are displaced from each other, this displacement can be corrected later through the correction phase angle.

(8) In the testing method of the present embodiment, after the input shaft WI and the rotation shaft 21 are coupled together, the motor machine angle when the position of rotation of the input shaft WI reaches its reference position while the input side dynamometer 2 is being rotated is acquired, this motor machine angle is set as the correction phase angle and thereafter the performance of the test piece W is evaluated by use of the torque command signal generated in the torque command generation device while the input side dynamometer 2 is being driven. In this way, without the positions being made to coincide with each other such that the reference positions of the input shaft WI and the rotation shaft 21 coincide with each other when they are coupled together, after the coupling, the correction phase angle is set to an appropriate size, and thus the drive torque which is varied in synchronization with the mechanical phase of the actual engine is input to the test piece, with the result that it is possible to appropriately evaluate its performance.

Fifth Embodiment

A testing system 1D according to a fifth embodiment of the present invention will be described next with reference to drawings. In the description of the testing system 1D below, the same configurations as those of the testing system 1B of the third embodiment are identified with the same reference numerals, and detailed description thereof will be omitted.

Figure 8:
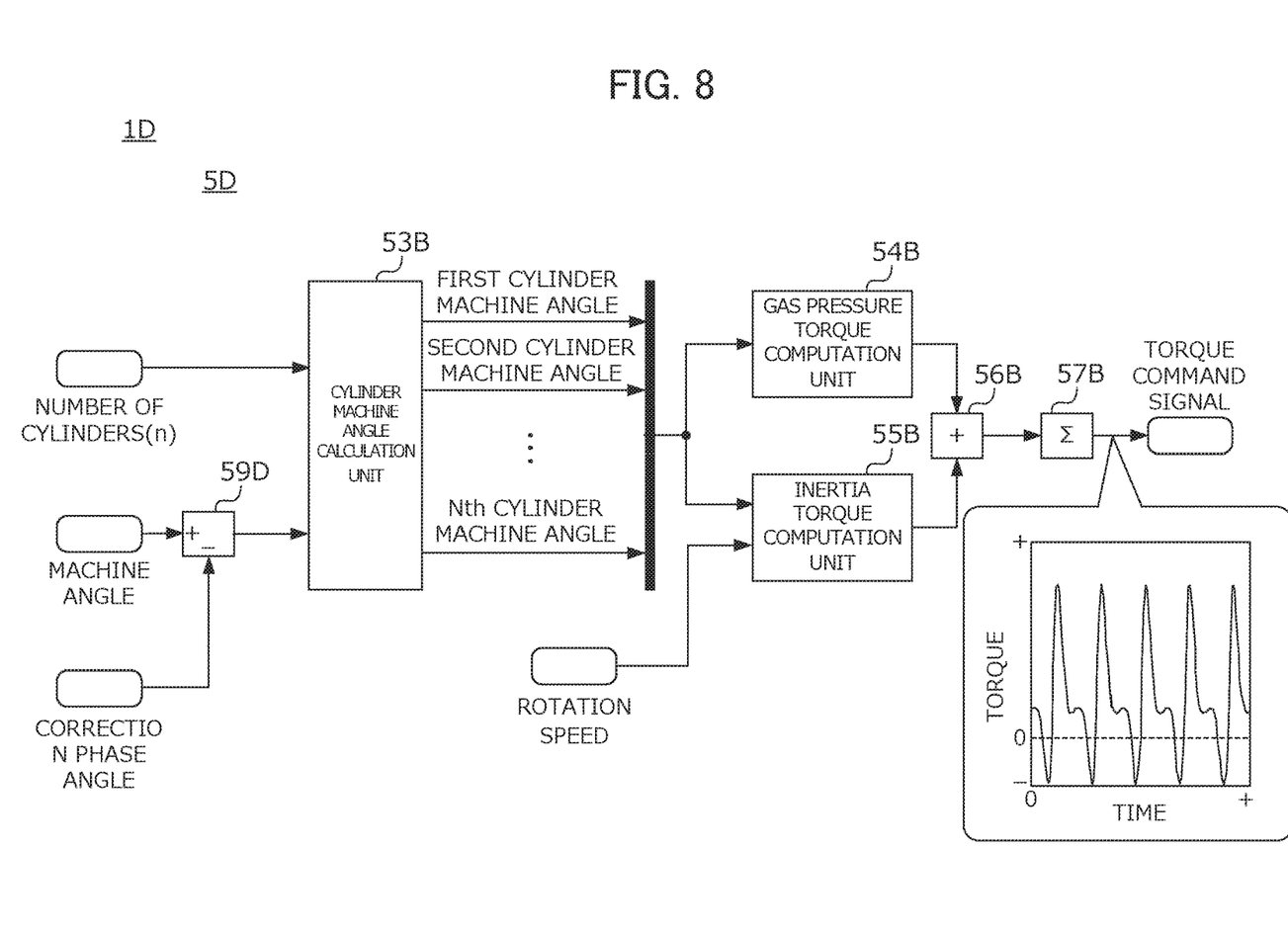
FIG. 8 is a block diagram showing a specific computation procedure for generating a torque command signal in a torque command generation device of a testing system according to a fifth embodiment of the present invention.

FIG. 8 is a block diagram showing a specific computation procedure for generating a torque command signal in a torque command generation device 5D of the testing system 1D according to the present embodiment.

The torque command generation device 5D includes a phase correction unit 59D, the cylinder machine angle calculation unit 53B, the gas pressure torque computation unit 54B, the inertia torque computation unit 55B, the addition unit 56B and the torque summation unit 57B, and uses them so as to generate a torque command signal that simulates a periodic torque variation in the actual engine. In other words, the torque command generation device 5D is obtained by adding the phase correction unit 59D to the torque command generation device 5B shown in FIG. 5.

The phase correction unit 59D subtracts a predetermined correction phase angle from a motor machine angle so as to calculate a phase angle. Here, as the correction phase angle, as in the testing system 1C of the fourth embodiment, a value set by the operator in the correction phase angle setting step of S12 in FIG. 7 is used. When in the cylinder machine angle calculation unit 53B, the phase angle calculated in the phase correction unit 59D and the number of cylinders in the engine are input, by a similar procedure as that of the cylinder machine angle calculation unit 53B of FIG. 5, cylinder machine angles [°] are calculated for the individual cylinders, that is, are calculated for only the number of cylinders. A specific computation procedure in the gas pressure torque computation unit 54B, the inertia torque computation unit 55B, the addition unit 56B and the torque summation unit 57B is the same as in FIG. 5, and thus detailed description thereof will be omitted. A procedure for testing the test piece W with the testing system 1D is also the same as in FIG. 7, and thus detailed description thereof will be omitted.

In the testing system 1D and the testing method of the present embodiment, the following effects are achieved.

(9) In the testing system 1D, the correction phase angle is subtracted from the motor machine angle such that the phase angle is calculated, this phase angle and the number of cylinders are further used such that the cylinder machine angles are calculated for the individual cylinders, the cylinder machine angles for the individual cylinders and the rotation speed are used such that produced torques are calculated for the individual cylinders and the produced torques for the individual cylinders are summed such that the torque command signal is obtained. In this way, it is possible to generate the torque command signal which has a period of an order multiple of the motor machine angle and which is varied in a form close to a torque variation in the actual engine. Even when the input shaft WI of the test piece W and the rotation shaft of the motor are connected such that the reference position of the input shaft WI of the test piece W and the reference position of the rotation shaft of the motor are connected so as to be displaced from each other, this displacement can be corrected later through the correction phase angle.

EXPLANATION OF REFERENCE NUMERALS 1, 1A, 1B, 1C, 1D: testing system
W: test piece
W1: input shaft
2: input side dynamometer (motor)
21: rotation shaft
4, 4A: rotation detector (machine angle acquisition means)
5, 5A, 5B, 5C, 5D: torque command generation device
6, 6A: inverter (machine angle acquisition means)

The invention claimed is:

1. A drive train testing system which includes: a motor that is connected to an input shaft of a drive train of a vehicle; and
    a torque command generation device that generates a torque command signal for producing a torque which simulates an engine of the vehicle with the motor, the drive train testing system comprising:
    an absolute encoder which produces a signal corresponding to a motor machine angle that corresponds to an absolute position from a reference position of a rotation shaft of the motor,
    wherein the torque command generation device uses the motor machine angle detected by the absolute encoder so as to generate the torque command signal which is varied in synchronization with a signal that has a period of a predetermined order multiple of the motor machine angle.

2. The drive train testing system according to claim 1, wherein the torque command generation device multiplies the order and the motor machine angle together so as to calculate a phase angle, and multiplies a sine wave or a cosine wave corresponding to the phase angle and a predetermined vibration amplitude together so as to obtain an alternating-current component of the torque command signal.

3. A drive train testing method which uses the drive train testing system according to claim 2 to input a drive torque produced in the motor to the input shaft of the drive train that is a test piece so as to evaluate performance of the test piece, the drive train testing method comprising:
- a test piece coupling step of coupling the input shaft to the rotation shaft so as to make positions thereof coincide with each other such that a reference position of the input shaft and a reference position of the rotation shaft coincide with each other; and
- a test step of using the torque command signal generated by the torque command generation device so as to evaluate the performance of the test piece while driving the motor.

4. The drive train testing system according to claim 1, wherein the torque command generation device uses the motor machine angle and a number of cylinders in the engine so as to calculate cylinder machine angles corresponding to positions of pistons for the individual cylinders, uses the cylinder machine angles for the individual cylinders and a rotation speed of the rotation shaft calculated with the motor machine angle so as to calculate produced torques for the individual cylinders and sums the produced torques for the individual cylinders so as to obtain the torque command signal.

5. A drive train testing method which uses the drive train testing system according to claim 4 to input a drive torque produced in the motor to the input shaft of the drive train that is a test piece so as to evaluate performance of the test piece, the drive train testing method comprising:
- a test piece coupling step of coupling the input shaft to the rotation shaft so as to make positions thereof coincide with each other such that a reference position of the input shaft and a reference position of the rotation shaft coincide with each other; and
- a test step of using the torque command signal generated by the torque command generation device so as to evaluate the performance of the test piece while driving the motor.

6. The drive train testing system according to claim 1, wherein the torque command generation device multiplies the order and the motor machine angle together so as to calculate a reference phase angle, subtracts a predetermined correction phase angle from the reference phase angle so as to calculate a phase angle and multiplies a sine wave or a cosine wave corresponding to the phase angle and a predetermined vibration amplitude together so as to obtain an alternating-current component of the torque command signal.

7. A drive train testing method which uses the drive train testing system according to claim 6 to input a drive torque produced in the motor to the input shaft of the drive train that is a test piece so as to evaluate performance of the test piece, the drive train testing method comprising:
- a test piece coupling step of coupling the input shaft to the rotation shaft;
- a correction phase angle setting step of acquiring the motor machine angle when a position of rotation of the input shaft reaches a reference position thereof while the motor is being rotated so as to set the acquired motor machine angle as the correction phase angle; and
- a test step of using the torque command signal generated by the torque command generation device so as to evaluate the performance of the test piece while driving the motor.

8. The drive train testing system according to claim 1, wherein the torque command generation device subtracts a predetermined correction phase angle from the motor machine angle so as to calculate a phase angle, uses the phase angle and a number of cylinders in the engine so as to calculate cylinder machine angles corresponding to positions of pistons for the individual cylinders, uses the cylinder machine angles for the individual cylinders and a rotation speed of the rotation shaft calculated with the motor machine angle so as to calculate produced torques for the individual cylinders and sums the produced torques for the individual cylinders so as to obtain the torque command signal.

9. A drive train testing method which uses the drive train testing system according to claim 8 to input a drive torque produced in the motor to the input shaft of the drive train that is a test piece so as to evaluate performance of the test piece, the drive train testing method comprising:
- a test piece coupling step of coupling the input shaft to the rotation shaft;
- a correction phase angle setting step of acquiring the motor machine angle when a position of rotation of the input shaft reaches a reference position thereof while the motor is being rotated so as to set the acquired motor machine angle as the correction phase angle; and
- a test step of using the torque command signal generated by the torque command generation device so as to evaluate the performance of the test piece while driving the motor.

10. A drive train testing system which includes: a motor that is connected to an input shaft of a drive train of a vehicle; and
- a torque command generation device that generates a torque command signal for producing a torque which simulates an engine of the vehicle with the motor, the drive train testing system comprising:
- an incremental encoder which produces, when a rotation shaft of the motor is rotated, a pulse signal corresponding to an amount of displacement of the rotation; and
- an inverter which uses the pulse signal of the incremental encoder so as to calculate a motor machine angle that corresponds to an absolute position from a reference position of the rotation shaft and which uses the motor machine angle to supply a drive current to the motor so as to realize the torque command signal,
- wherein the torque command generation device uses the motor machine angle calculated by the inverter so as to generate the torque command signal which is varied in synchronization with a signal that has a period of a predetermined order multiple of the motor machine angle.

11. The drive train testing system according claim 10, wherein the torque command generation device multiplies the order and the motor machine angle together so as to calculate a phase angle, and multiplies a sine wave or a cosine wave corresponding to the phase angle and a predetermined vibration amplitude together so as to obtain an alternating-current component of the torque command signal.

12. A drive train testing method which uses the drive train testing system according to claim 11 to input a drive torque produced in the motor to the input shaft of the drive train that is a test piece so as to evaluate performance of the test piece, the drive train testing method comprising:
- a test piece coupling step of coupling the input shaft to the rotation shaft so as to make positions thereof coincide with each other such that a reference position of the input shaft and a reference position of the rotation shaft coincide with each other; and
- a test step of using the torque command signal generated by the torque command generation device so as to evaluate the performance of the test piece while driving the motor.

13. The drive train testing system according to claim 10, wherein the torque command generation device uses the motor machine angle and a number of cylinders in the engine so as to calculate cylinder machine angles corresponding to positions of pistons for the individual cylinders, uses the cylinder machine angles for the individual cylinders and a rotation speed of the rotation shaft calculated with the motor machine angle so as to calculate produced torques for the individual cylinders and sums the produced torques for the individual cylinders so as to obtain the torque command signal.

14. A drive train testing method which uses the drive train testing system according to claim 13 to input a drive torque produced in the motor to the input shaft of the drive train that is a test piece so as to evaluate performance of the test piece, the drive train testing method comprising:
- a test piece coupling step of coupling the input shaft to the rotation shaft so as to make positions thereof coincide with each other such that a reference position of the input shaft and a reference position of the rotation shaft coincide with each other; and
- a test step of using the torque command signal generated by the torque command generation device so as to evaluate the performance of the test piece while driving the motor.

15. The drive train testing system according to claim 10, wherein the torque command generation device multiplies the order and the motor machine angle together so as to calculate a reference phase angle, subtracts a predetermined correction phase angle from the reference phase angle so as to calculate a phase angle and multiplies a sine wave or a cosine wave corresponding to the phase angle and a predetermined vibration amplitude together so as to obtain an alternating-current component of the torque command signal.

16. A drive train testing method which uses the drive train testing system according to claim 15 to input a drive torque produced in the motor to the input shaft of the drive train that is a test piece so as to evaluate performance of the test piece, the drive train testing method comprising:
- a test piece coupling step of coupling the input shaft to the rotation shaft;
- a correction phase angle setting step of acquiring the motor machine angle when a position of rotation of the input shaft reaches a reference position thereof while the motor is being rotated so as to set the acquired motor machine angle as the correction phase angle; and
- a test step of using the torque command signal generated by the torque command generation device so as to evaluate the performance of the test piece while driving the motor.

17. The drive train testing system according to claim 10, wherein the torque command generation device subtracts a predetermined correction phase angle from the motor machine angle so as to calculate a phase angle, uses the phase angle and a number of cylinders in the engine so as to calculate cylinder machine angles corresponding to positions of pistons for the individual cylinders, uses the cylinder machine angles for the individual cylinders and a rotation speed of the rotation shaft calculated with the motor machine angle so as to calculate produced torques for the individual cylinders and sums the produced torques for the individual cylinders so as to obtain the torque command signal.

18. A drive train testing method which uses the drive train testing system according to claim 17 to input a drive torque produced in the motor to the input shaft of the drive train that is a test piece so as to evaluate performance of the test piece, the drive train testing method comprising:
- a test piece coupling step of coupling the input shaft to the rotation shaft;
- a correction phase angle setting step of acquiring the motor machine angle when a position of rotation of the input shaft reaches a reference position thereof while the motor is being rotated so as to set the acquired motor machine angle as the correction phase angle; and
- a test step of using the torque command signal generated by the torque command generation device so as to evaluate the performance of the test piece while driving the motor.

* * * * *